United States Patent
Schumacher et al.

(10) Patent No.: US 10,713,404 B1
(45) Date of Patent: Jul. 14, 2020

(54) CUSTOMIZABLE DEBUG AND PROFILE MONITORING OF RECONFIGURABLE SYSTEMS

(71) Applicant: Xilinx, Inc., San Jose, CA (US)

(72) Inventors: Paul R. Schumacher, Berthoud, CO (US); Anurag Dubey, Boulder, CO (US); Pramod Chandraiah, Pleasanton, CA (US); Stephen P. Rozum, Loveland, CO (US); Hem C. Neema, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/218,133

(22) Filed: Dec. 12, 2018

(51) Int. Cl.
*G06F 30/00* (2020.01)
*G06F 30/34* (2020.01)
*G06F 11/36* (2006.01)
*G06F 9/445* (2018.01)

(52) U.S. Cl.
CPC .......... *G06F 30/34* (2020.01); *G06F 9/44505* (2013.01); *G06F 11/3624* (2013.01)

(58) Field of Classification Search
CPC ... G06F 30/34; G06F 9/44505; G06F 11/3624
See application file for complete search history.

(56) References Cited

U.S. PATENT DOCUMENTS

| | | | | |
|---|---|---|---|---|
| 6,584,601 B1 * | 6/2003 | Kodosky | ................. | G06F 30/34 716/103 |
| 6,904,480 B1 * | 6/2005 | Hobbs | ................. | G06F 13/4004 710/100 |
| 7,366,650 B2 * | 4/2008 | Nightingale | ........ | G06F 11/3664 703/26 |
| 7,613,599 B2 * | 11/2009 | Bade | ....................... | G06F 30/33 703/14 |
| 7,849,449 B2 * | 12/2010 | Andrade | ............ | G05B 19/0426 717/127 |
| 8,073,820 B2 * | 12/2011 | Srinivasan | ............ | G06F 16/252 707/688 |
| 8,438,306 B2 * | 5/2013 | De Lescure | ............ | G06F 15/16 709/238 |
| 9,846,587 B1 * | 12/2017 | Schumacher | ....... | G06F 11/3457 |
| 9,846,660 B2 * | 12/2017 | Styles | ..................... | G06F 13/28 |
| 9,977,758 B1 | 5/2018 | Schumacher et al. | | |

(Continued)

*Primary Examiner* — Naum Levin
(74) *Attorney, Agent, or Firm* — Patterson + Sheridan, LLP

(57) ABSTRACT

Embodiments herein describe reconfigurable integrated circuits (ICs) which include programmable logic that can be configured to perform a user task. In one embodiment, the programmable logic is configured as an accelerator. The user may want to gather debug data or profiling data when executing the accelerator. Rather than using debug/profile circuitry disposed in a static region of the IC, the user can provide preferences to a linker which then dynamically configures debug/profile circuitry in a dynamic region of the IC. That is, based on user preferences, the linker can generate customized debug/profile circuitry for monitoring the performance of the accelerator. In one embodiment, the debug/profile circuitry is implemented in the dynamic region of the IC and is tailored to user preferences rather than relying on static, or fixed, debug/profile circuitry. Moreover, the user can retrieve the debug/profiling data on demand using a call back and a device driver.

20 Claims, 7 Drawing Sheets

(56) References Cited

U.S. PATENT DOCUMENTS

| | | | |
|---|---|---|---|
| 10,241,885 B2* | 3/2019 | Guim Bernat | H03K 19/1776 |
| 10,248,585 B2* | 4/2019 | Ma | G06F 13/4282 |
| 10,255,400 B1* | 4/2019 | Villarreal | G06F 30/327 |
| 10,380,313 B1* | 8/2019 | Schumacher | G06F 30/398 |
| 2015/0046679 A1* | 2/2015 | Gathala | G06F 8/443 |
| | | | 712/30 |
| 2016/0132441 A1* | 5/2016 | Styles | G06F 13/28 |
| | | | 710/110 |
| 2018/0267878 A1* | 9/2018 | Guim Bernat | G06F 11/3013 |
| 2019/0353696 A1* | 11/2019 | Hsu | G01R 31/31907 |

\* cited by examiner

500 ⟶

```
"debug_ip_layout":
    "m_count": "3",          ⟵ COUNT 501
    "m_debug_ip_data":
      "debug_ip_data":
        "m_type": "AXI_MM_MONITOR",    ⟵ MONITOR TYPE 505A
        "m_properties": "6";           ⟵ PROPERTIES 510A
        "m_base_address": "0x1820000"; ⟵ ADDRESS 515A
        "m_name": "interconnect_aximm_host/M00_AXI"  ⟵ MONITORED
                                                      RESOURCE
                                                      520A
      ,
      "debug_ip_data":
        "m_type": "AXI_MM_MONITOR";    ⟵ 505B
        "m_properties": "3",           ⟵ 510B
        "m_base_address": "0x1830000"; ⟵ 515B
        "m_name": "median_1/M_AXI_GMEM" ⟵ 520B
      ,
      "debug_ip_data":
        "m_type": "ACCEL_MONITOR";     ⟵ 505C
        "m_properties": "7";           ⟵ 510C
        "m_base_address": "0x1850000"; ⟵ 515C
        "m_name": "median_1"           ⟵ 520C
```

CUSTOMIZABLE DEBUG AND PROFILE MONITORING OF RECONFIGURABLE SYSTEMS

TECHNICAL FIELD

Examples of the present disclosure generally relate to establishing debug circuitry in programmable logic according to user preference.

BACKGROUND

Programmable integrated circuits (e.g., programmable logic devices, field programmable gate arrays (FPGAs), etc.) can include a dynamic region (e.g., programmable logic or configurable hardware elements) and a static region (e.g., non-programmable circuitry). Often the static region includes circuitry used to access PCIe communication interfaces and off-chip memory while the dynamic region includes programmable circuitry that can be customized to perform a user task.

Debug and profile circuitry (e.g., debug and profile monitors) which can include counters and traces are typically disposed in the static region. As such, the debug circuitry is not customizable by the user. The debug circuitry takes up valuable space in the static region and may include too much, or too little, circuitry for monitoring the user-defined circuitry in the dynamic region.

SUMMARY

Techniques for customizing and interacting with monitoring circuitry for a dynamic region of a reconfigurable integrated circuit (IC) are described. One example is a method that includes compiling source code corresponding to a kernel to form binary object code, determining customized monitoring circuitry to form in programmable logic based on received debug/profile preferences, linking the monitoring circuitry and the kernel in a hardware design representing a reconfigurable IC, and generating, based on the hardware design, a bitstream for configuring the programmable logic in the reconfigurable IC to implement the monitoring circuitry.

Another example herein is a non-transitory computer readable storage medium that includes computer readable program code embodied thereon, the program code performs an operation when executed on a computer processor. The operation includes compiling source code corresponding to a kernel to form binary object code, determining customized monitoring circuitry to form in programmable logic based on received debug/profile preferences, linking the monitoring circuitry and the kernel in a hardware design representing a reconfigurable IC, and generating, based on the hardware design, a bitstream for configuring the programmable logic in the reconfigurable IC to implement the monitoring circuitry.

Another example herein is a host computing system that includes a processor and memory, where the memory includes compiler and a linker. The compiler is configured to compile source code corresponding to a kernel to form binary object code. The linker is configured to determine customized monitoring circuitry to form in programmable logic based on received debug/profile preferences and link the monitoring circuitry and the kernel in a hardware design representing a reconfigurable IC. Moreover, the host computing system is configured to generate, based on the hardware design, a bitstream for configuring the programmable logic in the reconfigurable IC to implement the monitoring circuitry.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 5 illustrates metadata describing debug/profile circuitry in a bitstream, according to an example.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
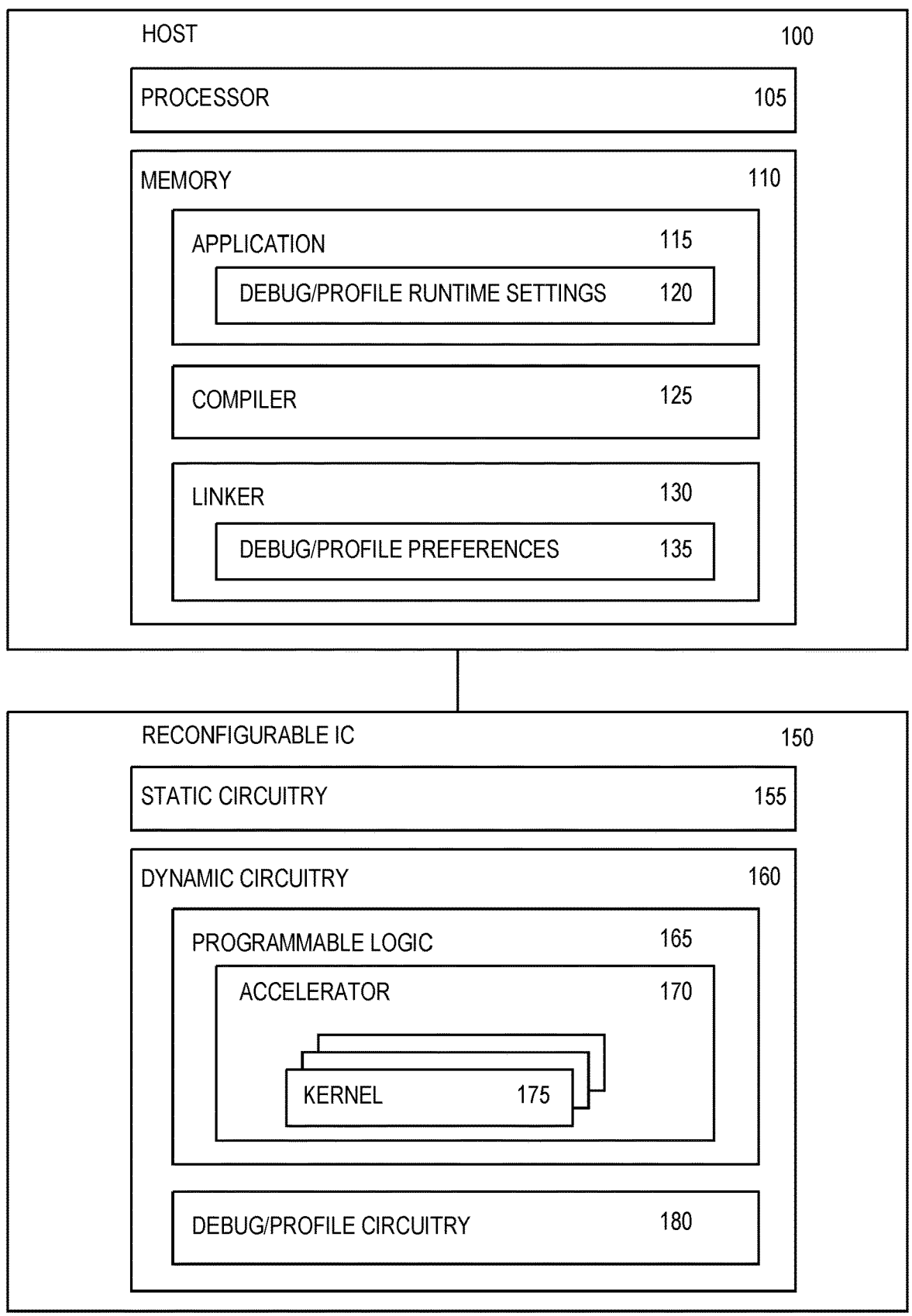
FIG. 1 illustrates a host that uses an accelerator in a reconfigurable integrated circuit, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe reconfigurable integrated circuits (ICs) which include programmable logic that can be configured to perform a user task. In one embodiment, the programmable logic is configured as an accelerator such as a graphics processing unit (GPU), a cryptography co-processor, a network processor, an A/V encoder/decoder, and the like. The IC can be mounted in a host computing system which transmits tasks to be performed by the accelerator.

The user may want to gather debug data or profile data when executing the accelerator. Rather than using debug/profile circuitry (e.g., debug/profile monitors) disposed in a static region of the IC, the user can provide preferences to a linker which then dynamically configures debug/profile circuitry in a dynamic region of the IC. That is, based on user preferences, the linker can generate customized debug/profile circuitry for monitoring the performance and operation of the accelerator. For example, the user may indicate that the debug/profile circuitry should monitor a certain kernel in the accelerator (but not others), a particular port, or a particular connection. Further, the user can specify what functional blocks should be included in the debug/profile monitors such as counters and traces. In one embodiment, counters are an aggregated summary of activity, such as total bytes transferred or number of executions of a kernel, while trace is timestamped events to inform when those activities happened. Also, the linker can distribute the debug/profile circuitry throughout the dynamic region so the debug/profile circuitry is closer to the circuitry being monitored, which can improve performance. In this manner, the linker can generate customized debug/profile circuitry in the dynamic region of the IC tailored to user preferences rather than relying on static, or fixed, debug/profile circuitry in a static region of the IC.

In addition to generating customized debug/profile circuitry, during runtime the host computing system can pass debug/profile runtime settings to the IC which control the functionality and operation of the debug/profile circuitry. For example, the dynamic region may include three debug/profile monitors for monitoring three kernels in the accelerator but the user may want to use only two of debug/profile monitors when performing the current task. In another example, the debug/profile monitors may include both counters and traces, but the user may wish to use only counters for the current task. The user can customize the debug/profile runtime settings so that the debug/profile circuitry in the dynamic region performs only the tasks she desires.

FIG. 1 illustrates a host 100 (e.g., a host computing system) that uses an accelerator 170 in a reconfigurable IC 150, according to an example. For example, the IC 150 may be mounted on a printed circuit board (PCB) or a linecard that is mounted onto a motherboard in the host 100. The accelerator 170 can be a graphics processing unit (GPU), a cryptography co-processor, a network processor, an A/V encoder/decoder, and the like. However, the embodiments herein are not limited to an accelerator 170 and the IC 150 can perform other tasks for the host 100 such as kernels that execute one or more layers in a neural network.

The host 100 includes a processor 105 and memory 110. The processor 105 represents any number of computer processors which each can include any number of cores. The memory 110 can include volatile and non-volatile memory elements. In this example, the memory 110 includes an application 115 (e.g., a software application), a compiler 125, and a linker 130. The application 115 represents any software application that transmits tasks to be performed by the accelerator 170. For example, the application 115 may be a graphics application that relies on the accelerator 170 to perform vector calculations, or a security application that uses the accelerator 170 to encrypt or decrypt data. In another example, the application 115 may be a machine learning (ML) model (e.g., a neural network) that relies on the accelerator 170 to perform a compute intensive task such as convolution associated with one of the layers in the ML model.

The application 115 includes debug/profile runtime settings 120 that configure debug/profile circuitry 180 (referred to generally as "monitoring circuitry" which can perform debug operations, profiling operations, or a combination of both) in the reconfigurable IC 150. As described in more detail below, the user can set the runtime settings 120 to control the function of the debug/profile circuitry 180 when the accelerator 170 executes its current task. For example, the runtime settings 120 may activate a subset of the debug/profile monitors in the circuitry 180, or activate a subportion of the features in the debug/profile circuitry 180. In sum, the debug/profile runtime settings 120 permit the user to control the debug/profile circuitry 180 and its overhead (e.g., the used clock cycles and power consumption) when monitoring the execution of the accelerator 170.

The compiler 125 can be any software compiler that can compile received source code into binary object code. In one embodiment, a user provides source code for the accelerator 170 (referred to as kernel source code). The compiler 125 compiles the kernel source code to form binary object code for the accelerator 170.

The linker 130 is a software application that links the hardware elements defined by the kernel source code (e.g., the kernels and compute units forming the accelerator 170) to debug/profile circuitry 180. To do so, the linker 130 includes debug/profile preferences 135 which indicate the type of debug/profile monitors and their functions. Using the debug/profile preferences 135, the linker 130 can generate the debug/profile circuitry 180 as described in detail below.

The reconfigurable IC 150 includes static circuitry 155 that is disposed in a static region of the IC 150 and dynamic circuitry 160 that is disposed in a dynamic region of the IC 150. The static circuitry 155 can include circuitry or other hardware elements that are commonly used by the user applications. That is, regardless of the type of accelerator 170 currently implemented in the IC 150, the various types of accelerators may all rely on the same type of interface for communicating with off-chip memory or with the host 100. The circuitry for these interfaces can be disposed in the static circuitry 155. In one embodiment, the static circuitry 155 includes hardened circuitry which a user cannot change. While FIG. 1, illustrates the use of static circuitry 155, the embodiments herein can apply in an IC that relies solely on dynamic circuitry 160. That is, a design could be entirely dynamically constructed and still make use of the concepts described herein.

The dynamic circuitry 160, in contrast to the static circuitry 155, is configurable by the user. In this example, the dynamic circuitry 160 includes programmable logic 165 which can be configured to form a hardware element—e.g., a hardware accelerator 170. For example, the static circuitry 155 provides various communication and memory interfaces that permit the accelerator 170 in the dynamic circuitry 160 to perform tasks assigned by the application 115 in the host 100.

The accelerator 170 includes a plurality of kernels 175. Although not shown, each kernel 175 can have multiple instances referred to as compute units. For example, the accelerator 170 may include six kernels 175 that each includes two compute units. However, this is only one example arrangement of the accelerator 170.

The debug/profile circuitry 180 can include multiple debug/profile monitors. Moreover, the debug/profile circuitry 180 can be distributed throughout the programmable logic 165. For example, the debug/profile monitors may be disposed near a respective one of the kernels 175. Thus, not only does disposing the debug/profile circuitry 180 in the dynamic circuitry 160 (rather than the static circuitry 155) enable the user to control the amount of debug/profile circuitry 180 in the IC 150, it also enables the debug/profile circuitry 180 to be distributed in the IC 100 closer to the hardware elements in the accelerator 170 (e.g., the kernels 175) being monitored. Doing so may reduce the performance cost of the debug/profile circuitry 180.

Figure 2:
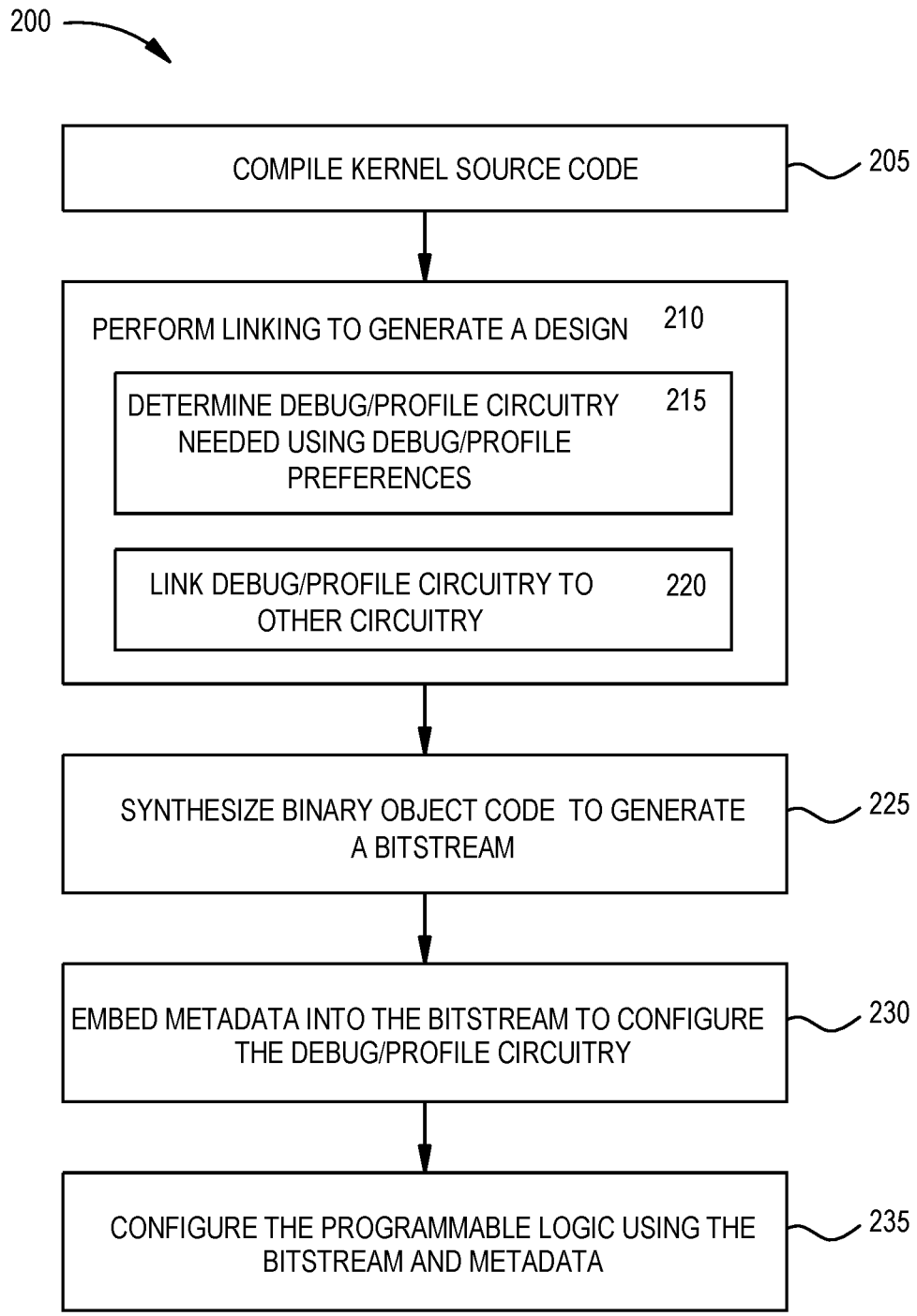
FIG. 2 is a flowchart for establishing debug/profile circuitry in a reconfigurable integrated circuit, according to an example.

FIG. 2 is a flowchart of a method 200 for establishing debug/profile circuitry in a reconfigurable integrated circuit, according to an example. At block 205, the compiler compiles kernel source code into corresponding binary object code. In one embodiment, the compiler outputs binary object code for the individual kernels in an accelerator. For example, the accelerator may include multiple kernels which may have the same, or different, configurations.

At block 210, the linker performs linking to form a hardware design that includes the accelerator and the debug/profile circuitry. The hardware design can also include memory controllers, interface controllers (e.g., PCIe controllers) and all the connectivity between these hardware components. Performing linking at block 210 is subdivided into blocks 215 and 220.

At block 215, the linker determines debug/profile circuitry needed using debug/profile preferences specified by the user. In one embodiment, a user can select a profile monitoring type from at least three types of profile monitoring: data, stall, and execution. In addition (or alternatively), the user can select a debug monitoring type from two types of debug monitoring: protocol checkers and integrated logic analyzers. That is, the user can indicate in the debug/profile preferences whether she wants the debug/profile circuitry to perform one, two, or all three of these profile monitoring options or one or both of the debug monitoring options. Additionally, the user can specify what hardware components she wants the debug/profile circuitry to monitor. The linker can select individually, or in combination, a particular kernel in the accelerator, a particular port, or a particular connection in the programmable logic to be monitored by the monitoring circuitry in response to user preferences. For example, the user can indicate which kernels and/or compute units to monitor, or an individual data port on a kernel or compute unit. That is, the user can indicate she wants debug/profile circuitry to monitor two ports on a first kernel (but ignore the remaining ports), one port on a second kernel, and no ports on a third kernel. In this manner the user can specify the type of monitoring, in addition to which specific, granular hardware elements should be monitored.

The linker determines the debug/profile circuitry required to satisfy the debug preferences provided by the user. The linker then creates and inserts the customized debug/profile monitors into the design and connects those monitors to the other hardware elements (e.g., kernels, memory controllers, interface controllers, etc.).

Figure 3:
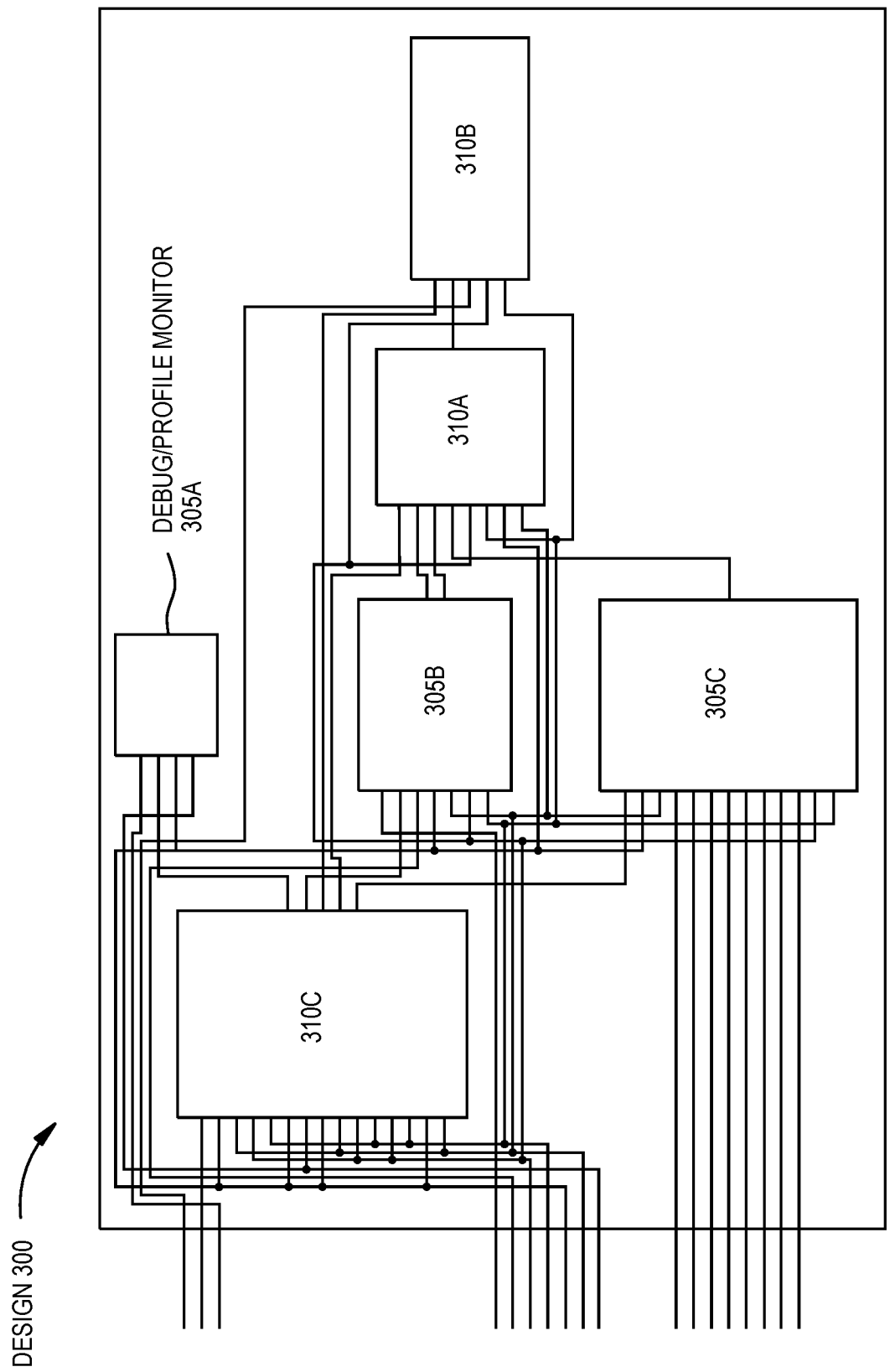
FIG. 3 illustrates a design that links debug/profile circuitry to accelerator circuitry, according to an example.

FIG. 3 illustrates a hardware design 300 that links debug/profile circuitry to accelerator circuitry, according to an example. In one embodiment, the hardware design is a logical view of a desired configuration of the reconfigurable integrated circuit. The design 300 includes different debug/profile monitors 305A-305C which can have different functionalities and circuitry. Moreover, the debug/profile monitors 305 may be connected to different hardware elements 310A-310C in the design 300. The hardware elements 310 are intended to represent various hardware elements in the design 300 of the reconfigurable IC, such as kernels, compute units, ports, controllers, and the like. The linker can decide the number as well as the location of the debug/profile monitors 305 within the design 300. Further, the linker can determine what types of monitoring the debug/profile monitors 305 can perform.

Figure 4:
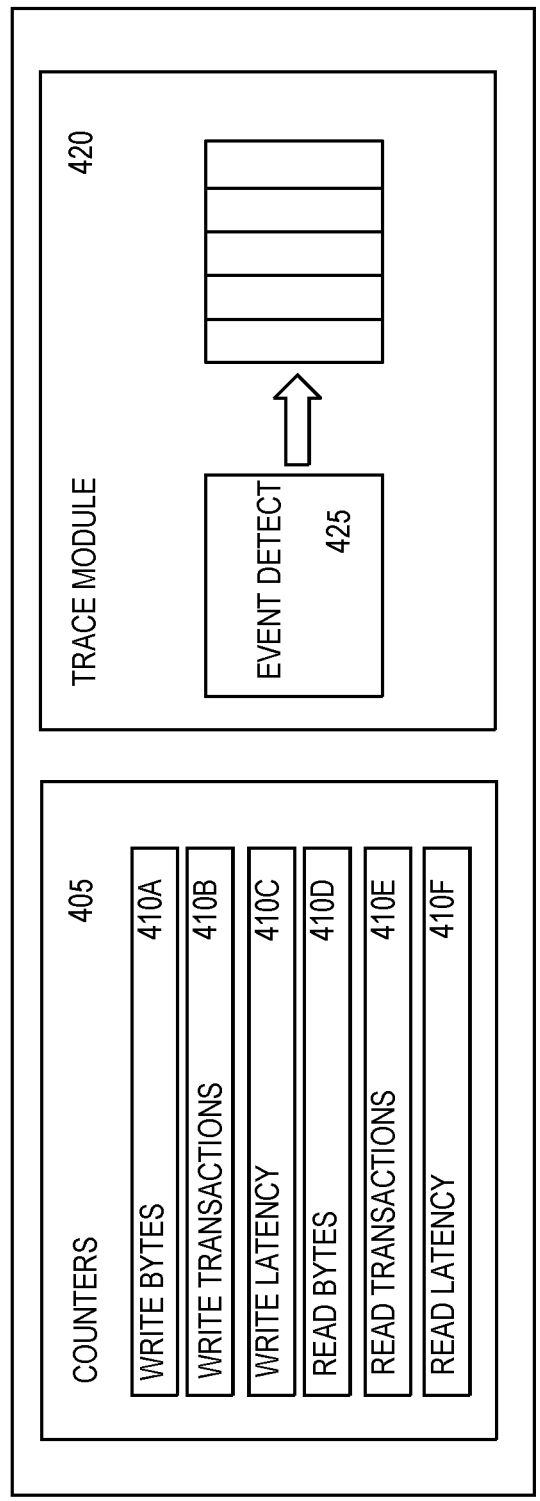
FIG. 4 is a block diagram of a debug/profile monitor, according to an example.

FIG. 4 is a block diagram of a debug/profile monitor 305, according to an example. In one embodiment, the debug/profile monitor 305 can also be referred to as a monitor core. The debug/profile monitor 305 in FIG. 4 is one example of a monitor 305 that can be inserted into the design by using the method 200.

In this example, the debug/profile monitor 305 includes separate modules for counters 405 and a trace module 410. The counters 405 gather numerical statistics of events like data transfers, total bytes sent total latencies, execution time, etc. This information can be stored in a write bytes portion 410A, a write transaction section 4106, a write latency portion 410C, a read bytes portion 410D, a read transaction portion 410E, and a read latency 410F portion.

The trace module 420 is an event collection mechanism that allows visualization of relative occurrence of hardware/software events in a common timeline. An event detect engine 425 detects the occurrence of these hardware/software events. In one embodiment, traces from the debug/profile monitors 305 in the IC are aggregated at a central location using a round-robin approach.

While the debug/profile monitor 305 in FIG. 4 includes both counters 405 and the trace module 420, this is just one example. Based on user preferences, the linker can select at least at least one of a counter and a trace in the monitoring circuitry (e.g., the debug/profile monitors) to use when monitoring the particular kernel in the accelerator, the particular port, or the particular connection. Other debug/profile monitors 305 in the same IC may have only one of these features. Further, instead of including all the portions 410A-410F, other debug/profile monitors 305 may have counters 405 for monitoring only a subset of the types of the numerical statistics stored in these portions 410. Alternatively, other debug/profile monitors 305 may gather different types of numerical statistics than the ones shown here such as min/max latency, number of packets, stalling/starving in communication channels, and the like. Thus, the monitoring circuitry in the dynamic region of the reconfigurable IC can include multiple debug/profile monitors that have different configurations (although some of the monitors may have the same configuration).

Returning to method 200, at block 220 the linker links the debug/profile circuitry to other circuitry in the IC. This is illustrated in the design 300 in FIG. 3 where the debug/profile monitors 305 are connected to the hardware elements 310. The design 300 represents, using a logical view, the ultimate physical layout of the debug/profile monitors 305 and the hardware elements 310 in the programmable logic of the IC.

At block 225, a synthesizer synthesizes the binary object code generated by the compiler to generate a bitstream. The bitstream includes the data necessary for the reconfigurable IC to configure the programmable logic to implement the accelerator (e.g., one or more of the hardware elements 310 illustrated in FIG. 3).

At block 230, the linker embeds metadata into the bitstream generated by the synthesizer to configure the debug/profile circuitry. In one embodiment, after the program binary is built, the information about the debug/profile circuitry (e.g., information about the debug/profile monitors 305) should be passed to a runtime on the reconfigurable IC. This can be accomplished by embedded the metadata into the bitstream (or into the system binary for the accelerator).

FIG. 5 illustrates metadata 500 that can be inserted into a bitstream or system binary, according to an example. The metadata 500 includes a count 501 field indicating the number of debug/profile monitors in the debug/profile circuitry (three in this example). Each debug/profile monitor includes a respective section in the metadata 500 for describing the monitor. For example, each monitor has a monitor type 505 field, a properties 510 field, an address 515 field, and a monitored resource 520 field.

For the first debug/profile monitor, the monitor type 505A is AXI_MM_MONITOR—e.g., a debug/profile monitor that monitors an Advanced eXtensible Interface (AXI) and/or Memory Mapped (MM) communication interface. The properties 510A field specifies which settings are enabled in the monitor. For example, an AXI_MM_MONITOR debug/profile monitor can have a 3-bit property value while looks like the following: m_property=(is_host<<2)+(use_counters<<1)+(use_trace) where 'is_host' specifies whether it is the host being monitored, 'use_counters' specifies whether counters are enabled, and 'use_trace' specifies if trace is enabled.

The address 515A enables other circuitry to communicate with the debug/profile monitor. For example, the addresses 515 for each debug/profile monitor can be unique.

The monitored resource 520A (i.e., 'interconnect_aximm_host/M00_AXI') indicates what hardware element the first debug/profile monitor is monitoring. As shown in metadata 500, each of the three debug/profile monitors monitor a different resource 520. That is, each of the debug/profile monitors is connected to a different hardware element in the IC in order to monitor their respective performances.

The metadata 500 can include more descriptive information about the debug/profile monitors. For example, in addition to information shown in FIG. 5, the metadata 500 could also include major/minor version numbers (fields m_major and m_minor) of the monitors.

The information contained in the metadata 500 should be passed to the runtime in the reconfigurable IC so that the design generated by the linker can be properly monitored with executed. As mentioned above, the metadata 500 can be inserted into the bitstream or the system binary in order to provide the information described above to the runtime in the reconfigurable IC. In another embodiment, the metadata 500 can be transmitted to the reconfigurable IC via a side channel.

Returning to method 200, at block 235, the runtime in the reconfigurable IC configures the programmable logic using the bitstream and the metadata. In one embodiment, the metadata describing the debug/profile circuitry is extracted from the bitstream (e.g., the system binary) and stored at a globally accessible file in a virtual filesystem (e.g., sysfs). At the conclusion of block 235 (and method 200), the IC has the configuration shown in FIG. 1 where the programmable logic 165 includes the accelerator 170 (with one or more kernels 175) and the debug/profile circuitry 180 which can have multiple debug/profile monitors or cores distributed throughout the logic 165.

Figure 6:
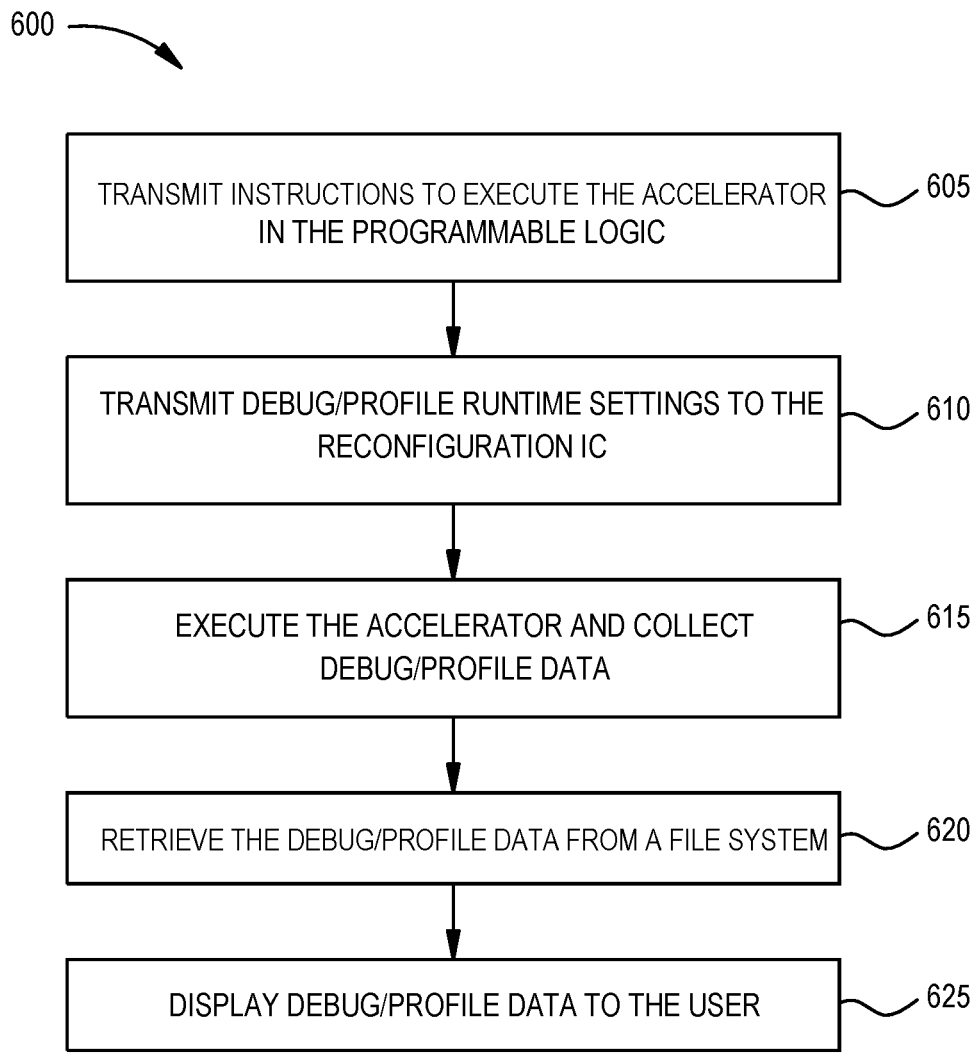
FIG. 6 is a flowchart for transmitting runtime settings for debug/profile circuitry, according to an example.

FIG. 6 is a flowchart of a method 600 for transmitting runtime settings for debug/profile circuitry, according to an example. At block 605, the application executing on the host transmits instructions to execute the accelerator in the programmable logic. For example, if the accelerator performs a graphics operation, the application may transmit a grouping of vectors to be processed by the accelerator according to the instructions. If the accelerator is a crypto-accelerator, the application may transmit a batch of encrypted data and instruct the accelerator to decrypt the data.

In one embodiment, the application stores the data to be processed by the accelerator in the memory in the host and indicates to the IC the location of the data so the data can be retrieved and processed by the accelerator. This frees the application to perform other tasks while the accelerator retrieves and processes the data according to the instructions provided by the application. The accelerator can indicate when it has finished processing the data which means the application can assign another task to the accelerator. In this manner, the application on the host can transmit individual tasks to be performed by the accelerator.

At block 610, the application transmits debug/profile runtime settings to the reconfigurable IC. The debug/profile runtime settings control the operation of the debug/profile circuitry when the accelerator performs the task assigned during block 605. For example, the runtime settings can indicate which of the debug/profile monitors are active and which are inactive. The settings can also indicate what functions the active debug/profile monitors should perform. For example, an active debug/profile monitor may include both counters and a trace module, but using the debug/profile runtime settings, the user can instruct the debug/profile monitor to perform only a trace.

At block 615, the reconfigurable IC executes the accelerator and collects debug/profile data. That is, while the accelerator performs the task, the debug/profile circuitry collects debug/profile data (e.g., trace data or performance statistics). The type and amount of the debug/profile data can be set by the debug/profile runtime settings as described above.

At block 620, the application on the host retrieves the debug/profile data from a file system. In one embodiment, the host includes a device driver that permits the application to retrieve the debug/profile data on demand. For example, the reconfigurable IC can store the debug/profile data is a shared file system which is accessible to the application on the host using the device driver which serves as an intermediary between the application and the hardware in the reconfigurable IC. In this manner, the application can retrieve the debug/profile data each time the accelerator executes a task.

In one embodiment, the file system is a pseudo file system with virtual files. When the user wants to retrieve the debug/profile data (whether using the user's own scripts, or by looking at the virtual files), the act of looking at the virtual files triggers a corresponding registered call back into a device driver. This call back then retrieves the latest tracing/monitoring data from the debug/profile circuitry on demand and puts that back into the virtual file. The tracing/monitoring data is then percolated up to the user script/tool. In this embodiment, retrieving the data happens only when the user wants it (on demand), and thus, cycles are not spent on polling and writing out the data continuously.

At block 625, the application displays debug/profile data to the user. In one embodiment, the application uses a graphical user interface (GUI) to display the collected debug/profile data. The GUI can display performance statistics or metrics derived from debug/profile data such as data transfers, total bytes sent total latencies, execution time, hardware utilization, and the like. In this manner, the user can identify errors and/or performance issues in the accelerator.

Figure 7:
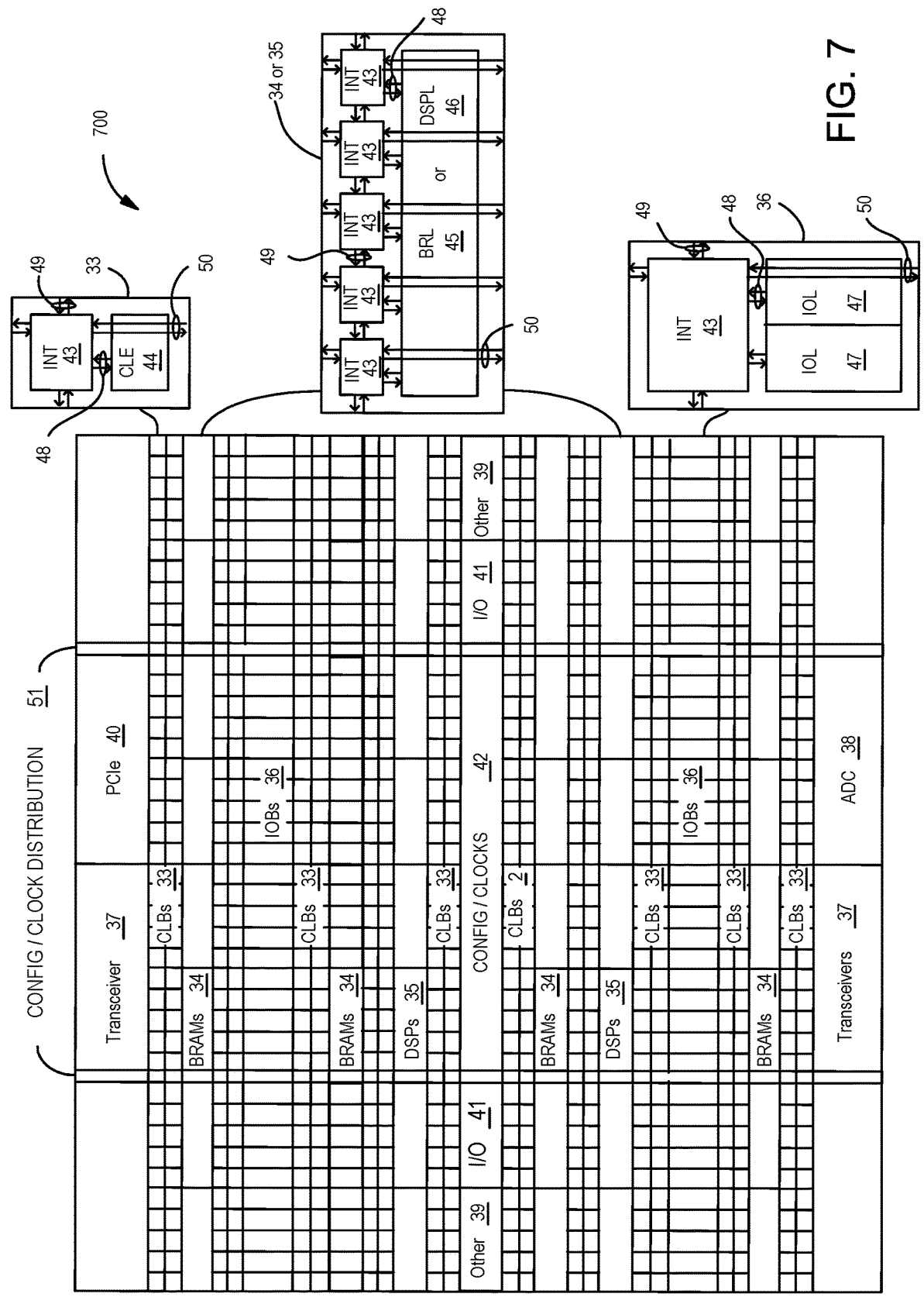
FIG. 7 illustrates a field programmable gate array implementation of a programmable IC according to an example.

FIG. 7 illustrates an FPGA 700 implementation of the IC 150 in FIG. 1 that includes a large number of different programmable tiles including transceivers 37, CLBs 33, BRAMs 34, input/output blocks ("IOBs") 36, configuration and clocking logic ("CONFIG/CLOCKS") 42, DSP blocks 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 7. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 7) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic.

Note that FIG. 7 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 7 are purely exemplary. For example, in an actual FPGA, more than one adjacent row of CLBs is typically included wherever the CLBs appear, to facilitate the efficient implementation of user logic, but the number of adjacent CLB rows varies with the overall size of the FPGA.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method, comprising:
    compiling source code corresponding to a kernel to form binary object code;
    determining monitoring circuitry to form in logic based on received at least one of debug or profile preferences;
    linking the monitoring circuitry and the kernel in a hardware design representing a reconfigurable integrated circuit (IC); and
    generating, based on the hardware design, a bitstream for configuring the logic in the reconfigurable IC to implement the monitoring circuitry.

2. The method of claim 1, wherein generating the bitstream comprises:
    synthesizing the binary object code to generate the bitstream; and
    embedding a metadata into the bitstream, wherein the metadata contains information for a plurality of debug/profile monitors in the monitoring circuitry to be formed in the logic, wherein the logic comprises programmable logic.

3. The method of claim 2, wherein the metadata defines, for each of the plurality of debug/profile monitors, a debug/profile monitor type, a respective address, and a hardware resource monitored by each of the plurality of debug/profile monitors, wherein determining the monitoring circuitry further comprises:
    parsing the metadata at the reconfigurable IC to determine debug and profiling functions of the monitoring circuitry.

4. The method of claim 1, wherein the hardware design is a logical view of a desired configuration of the reconfigurable IC, wherein the hardware design comprises a plurality of hardware elements connected to a plurality of debug/profile monitors forming the monitoring circuitry.

5. The method of claim 4, wherein the plurality of debug/profile monitors is distributed across different locations within the hardware design, wherein each of the plurality of debug/profile monitors has a different configuration relative to each other.

6. The method of claim 1, further comprising:
    configuring the reconfigurable IC using the bitstream to implement the kernel and the monitoring circuitry in the logic, wherein the logic comprises programmable logic.

7. The method of claim 6, further comprising:
    instructing the kernel on the reconfigurable IC to perform a task;
    transmitting debug/profile runtime settings to the reconfigurable IC, the debug/profile runtime settings controlling the operation of the monitoring circuitry when the kernel performs the task;
    collecting a debug/profile data using the monitoring circuitry according to the debug/profile runtime settings when the kernel performs the task; and
    outputting the debug/profile data on demand to a user application.

8. The method of claim 1, wherein determining the monitoring circuitry further comprises:
    selecting a profile monitoring type of the monitoring circuitry from at least one of data, stall, and executing; and
    selecting a debug monitoring type of the monitoring circuitry from at least one of protocol checkers and integrated logic analyzer.

9. The method of claim 1, wherein determining the monitoring circuitry further comprises:
    selecting at least one of a particular kernel in the reconfigurable IC, a particular port, and a particular connection in the logic to be monitored by the monitoring circuitry; and selecting at least at least one of a counter and a trace in the monitoring circuitry to use when monitoring the particular kernel in the reconfigurable IC, the particular port, or the particular connection.

10. A non-transitory computer readable storage medium comprising computer readable program code embodied thereon, the program code performs an operation when executed on a computer processor, the operation comprising:
compiling source code corresponding to a kernel to form binary object code;
determining monitoring circuitry to form in logic based on received at least one of debug and profile preferences;
linking the monitoring circuitry and the kernel in a hardware design representing a reconfigurable IC; and
generating, based on the hardware design, a bitstream for configuring the logic in the reconfigurable IC to implement the monitoring circuitry.

11. The non-transitory computer readable storage medium of claim 10, wherein generating the bitstream comprises:
synthesizing the binary object code to generate the bitstream; and
embedding a metadata into the bitstream, wherein the metadata contains information for a plurality of debug/profile monitors to be formed in the logic, wherein the logic comprises programmable logic.

12. The non-transitory computer readable storage medium of claim 11, wherein the metadata defines, for each of the plurality of debug/profile monitors, a debug/profile monitor type, a respective address, and a hardware resource monitored by each of the plurality of debug/profile monitors, wherein determining the monitoring circuitry further comprises:
parsing the metadata at the reconfigurable IC to determine debug and profiling functions of the monitoring circuitry.

13. A host computing system, comprising:
a processor; and
memory comprising a compiler and a linker, wherein the compiler is configured to compile source code corresponding to a kernel to form binary object code,
wherein the linker is configured to:
determine monitoring circuitry to form in logic based on received at least one of debug and profile preferences, and
link the monitoring circuitry and the kernel in a hardware design representing a reconfigurable IC,
wherein the host computing system is configured to generate, based on the hardware design, a bitstream for configuring the logic in the reconfigurable IC to implement the monitoring circuitry.

14. The host computing system of claim 13, wherein generating the bitstream comprises:
synthesizing the binary object code to generate the bitstream; and
embedding metadata into the bitstream, wherein the metadata contains information for a plurality of debug/profile monitors to be formed in the logic, wherein the logic comprises programmable logic.

15. The host computing system of claim 14, wherein the metadata defines, for each of the plurality of debug/profile monitors, a debug/profile monitor type, a respective address, and a hardware resource monitored by each of the plurality of debug/profile monitors, wherein determining the monitoring circuitry further comprises:
parsing the metadata at the reconfigurable IC to determine debug and profiling functions of the monitoring circuitry.

16. The host computing system of claim 13, wherein the hardware design is a logical view of a desired configuration of the reconfigurable IC, wherein the hardware design comprises a plurality of hardware elements connected to a plurality of debug/profile monitors in the monitoring circuitry.

17. The host computing system of claim 16, wherein the plurality of debug/profile monitors is distributed at different locations within the hardware design, wherein each of the plurality of debug/profile monitors has a different configuration relative to each other.

18. The host computing system of claim 13, further comprising:
an application in the memory, wherein the application is configured to:
instruct the kernel on the reconfigurable IC to perform a task;
transmit debug/profile runtime settings to the reconfigurable IC, the debug/profile runtime settings controlling the operation of the monitoring circuitry when the kernel performs the task; and
retrieve, on demand by the application, a debug/profile data collected by the monitoring circuitry according to the debug/profile runtime settings when the kernel performs the task.

19. The host computing system of claim 13, wherein determining the monitoring circuitry further comprises:
selecting a profile monitoring type of the monitoring circuitry from at least one of data, stall, and executing; and
selecting a debug monitoring type of the monitoring circuitry from at least one of protocol checkers and integrated logic analyzer.

20. The host computing system of claim 13, wherein determining the monitoring circuitry further comprises:
selecting at least one of a particular kernel in the reconfigurable IC, a particular port, and a particular connection in the logic to be monitored by the monitoring circuitry; and
selecting at least at least one of a counter and a trace in the monitoring circuitry to use when monitoring the particular kernel in the reconfigurable IC, the particular port, or the particular connection.

* * * * *

UNITED STATES PATENT AND TRADEMARK OFFICE
CERTIFICATE OF CORRECTION

Page 1 of 1

PATENT NO. : 10,713,404 B1
APPLICATION NO. : 16/218133
DATED : July 14, 2020
INVENTOR(S) : Paul Robert Schumacher et al.

It is certified that error appears in the above-identified patent and that said Letters Patent is hereby corrected as shown below:

In the Claims

Column 13, Line 1, In Claim 9, delete "at least at least" and insert -- at least --, therefor.

Column 14, Line 53, In Claim 20, delete "at least at least" and insert -- at least --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*